G. BROWN.
MEASURING MACHINE.
APPLICATION FILED APR. 18, 1918.

1,321,361.

Patented Nov. 11, 1919.
3 SHEETS—SHEET 1.

Witnesses.
J. K. Moore
R. E. Barry

Inventor.
George Brown
By Whitaker Prevost
Attys.

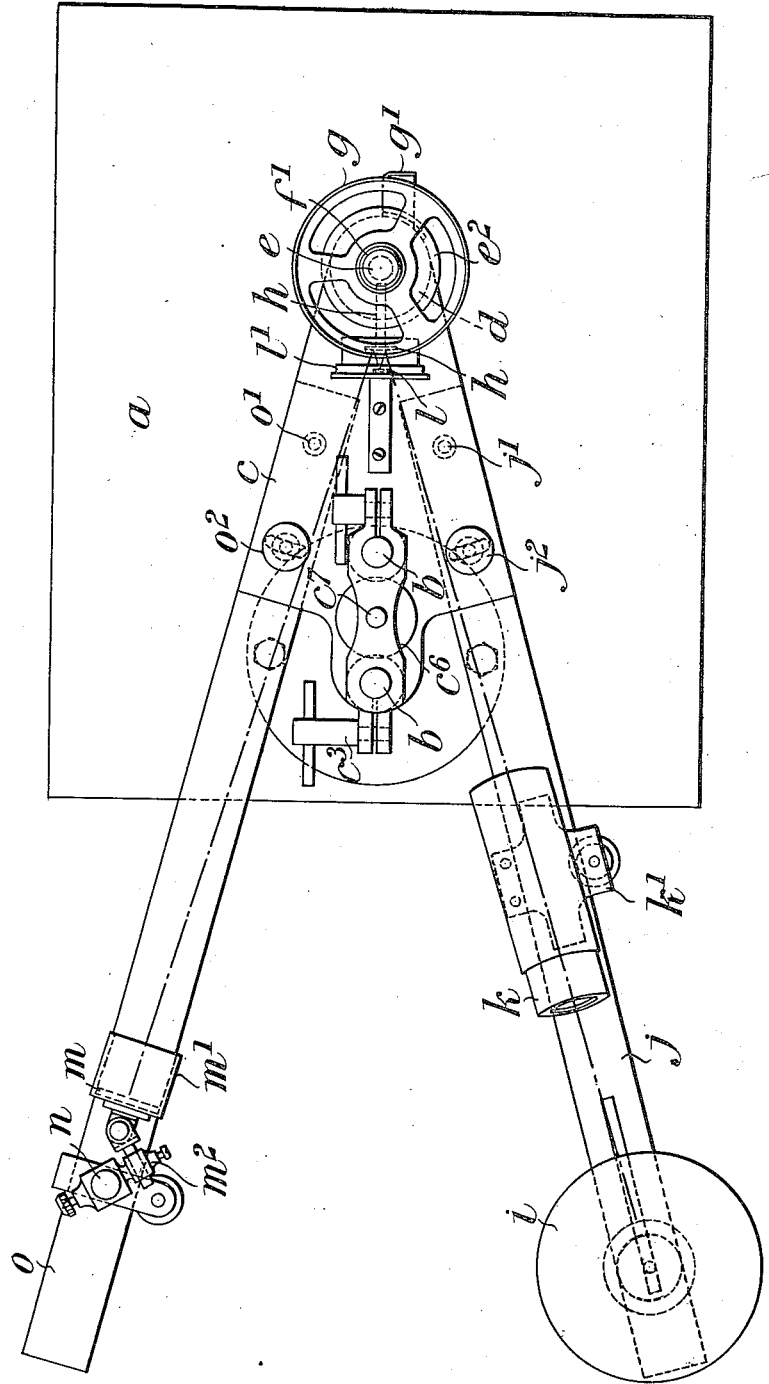

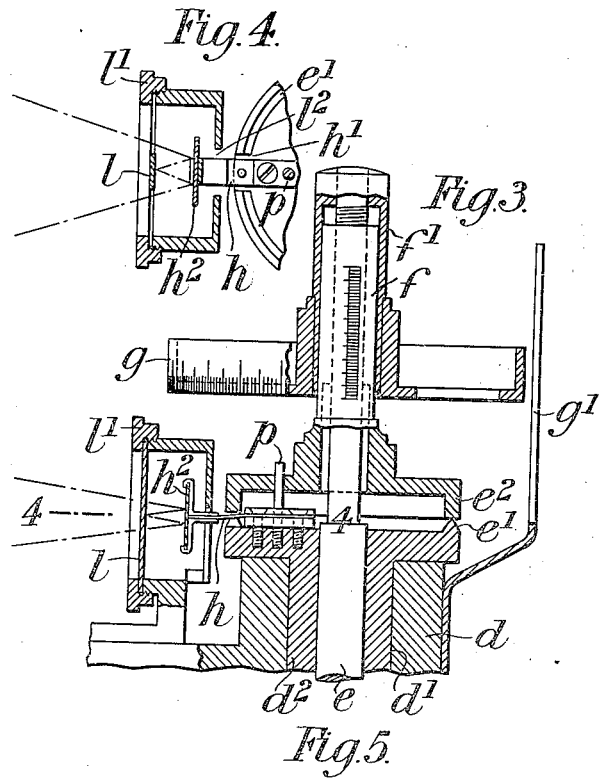
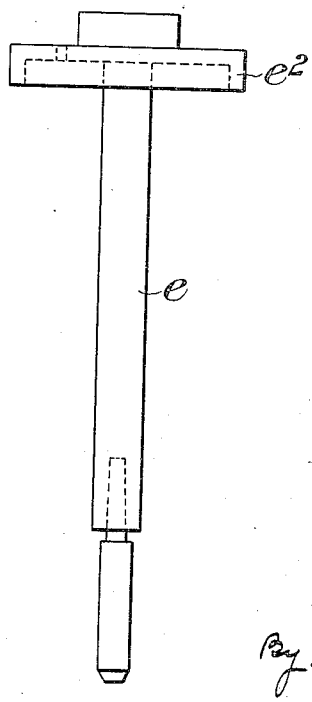

UNITED STATES PATENT OFFICE.

GEORGE BROWN, OF SOUTH NORWOOD, ENGLAND.

MEASURING-MACHINE.

1,321,361. Specification of Letters Patent. Patented Nov. 11, 1919.

Application filed April 18, 1918. Serial No. 229,397.

*To all whom it may concern:*

Be it known that I, GEORGE BROWN, a subject of the King of Great Britain, residing at 87 Grasmere road, Woodside, South Norwood, Surrey, England, have invented new and useful Improvements in Measuring-Machines, of which the following is a specification.

This invention relates to measuring machines for accurately measuring dimensions, such as the diameter of gages or the like, and to that class of machine which comprises a movable gravity head and a fixed anvil between which the gage or the like is placed, the gravity head being free to rest upon the gage and having in combination with it means for automatically indicating slight differences of movement between the head and the anvil.

According to the invention, I employ a movable gravity head and fixed anvil as usual between which the gage or the like to be measured is placed, the said head being freely movable in a bracket, preferably adjustably mounted upon upright rods or standards with relation to a base carrying or forming the anvil. The upper end of the bracket is furnished with a circular upstanding rim or flange, designed to act as a stop for a disk formed or screwed upon the gravity head and arranged to co-act with a blade spring fixed at one end to the bracket, and arranged in the path of the said disk, so that the movement of the disk will deflect the said spring. The latter is provided with a mirror on to which a beam of light is projected from a suitable source of light, such as an electric glow lamp, the beam of light being reflected from this mirror on to a stationary mirror and back to the movable mirror from which it is reflected on to a scale so that very slight movements of the head will be exaggerated on the said scale.

In using the machine for comparing the dimensions of a gage with a standard gage, the latter is placed upon the anvil and the bracket is adjusted upon the upright rods so that the gravity head rests freely upon the said standard gage without being supported by the rim or flange, whereby this indicator pointer indicates a point on the scale independent of the zero point above referred to. By now substituting the gage to be compared for the standard gage the difference of measurement will be indicated on the scale. When removing the gages or the like from the anvil it will be seen that the disk on the gravity head will fall and make contact with the stop, rim or flange and the indicator returns to the zero or part of the scale corresponding thereto, thus indicating that the machine has not got out of adjustment.

In practice I employ the gravity head with the fixed disk thereon when comparing objects, the movable or screwed disk being employed when measuring objects. This latter disk can, however, be employed when comparing objects and should it turn inadvertently upon the screwed gravity head such movement would be indicated by the indicator pointer not returning to the zero point above referred to.

When employing the screwed disk on the gravity head the latter is provided with a graduated scale over which works a pointer carried by the disk.

To enable the invention to be fully understood I will describe it by reference to the accompanying drawing, in which:—

Fig. 2 is a plan view thereof.

Fig. 3 is a sectional view drawn to a larger scale of a detail hereinafter described.

Fig. 4 is a section on the line 4—4, Fig. 3; and

Fig. 5 is a view of a modified form of gravity head.

Figure 1:
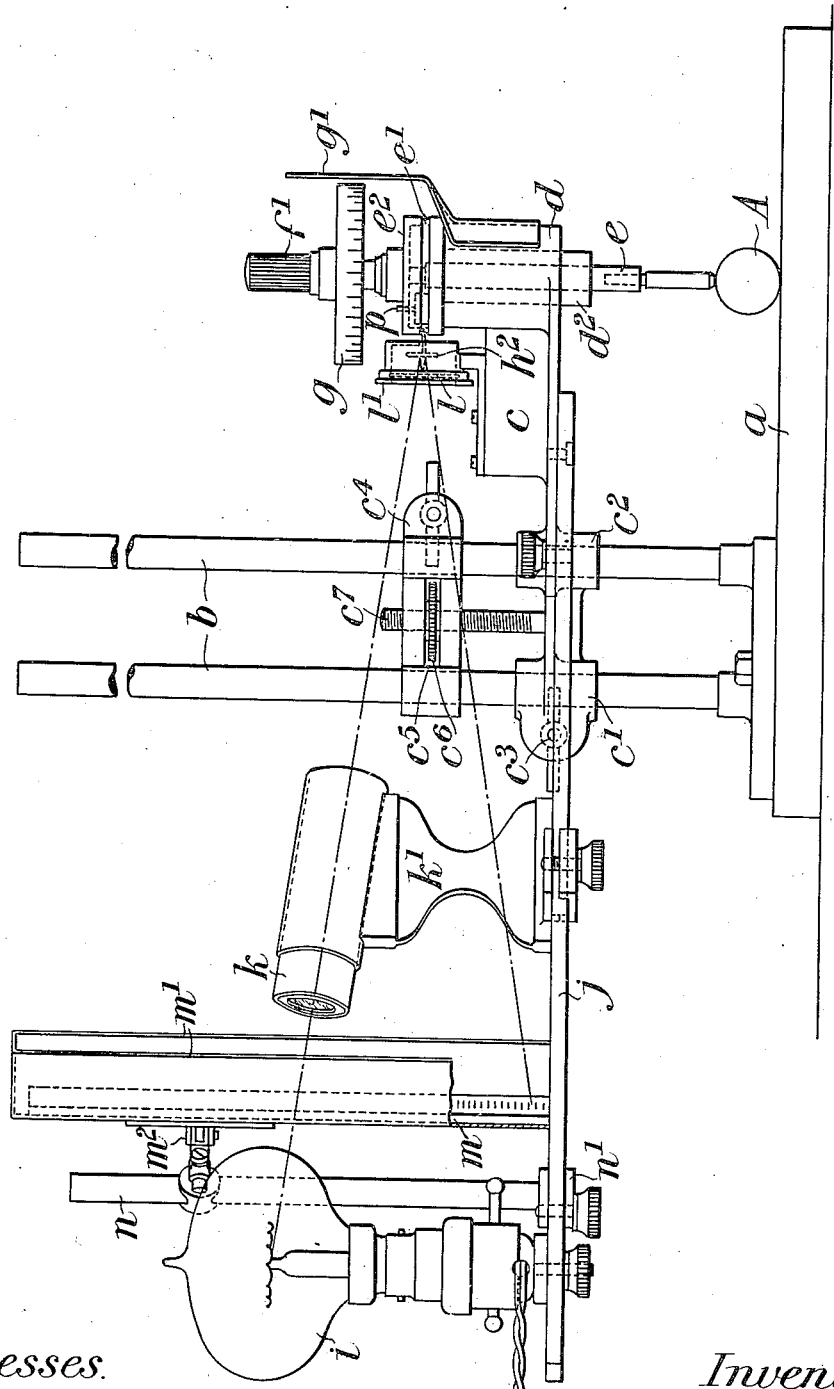
Figure 1 is a side elevation of a suitable construction of apparatus according to the invention.

$a$ indicates the anvil which, in the construction of machine illustrated, at the same time serves as the base-plate of the machine, $b$ are the two upright rods or standards which are secured to the lower ends of the base-plate $a$, and $c$ is the bracket which is adjustably mounted upon the said rods $b$. For this purpose the said bracket is provided with a pair of guides $c^1$, $c^2$ which are designed to slide on the rods $b$ and one of which is split and provided with a clamping screw $c^3$ so as to form a clamp. By releasing this clamping screw the bracket $c$ can be slid on the rods $b$. In conjunction with this clamping device there is also provided a second clamping guide $c^4$ having a slot $c^5$ in which can turn a milled nut $c^6$ which engages with a screw $c^7$, the lower end of which is attached to the bracket $c$. By this means the bracket $c$ can be accurately adjusted in position by first securing the upper clamp $c^4$, and then turning the milled nut $c^6$ until the correct position of the bracket is obtained, when the screw $c^3$ is tightened, thus securing the said bracket in place.

$d$ is a boss on the free end of the bracket $c$, the said boss having the hole $d^1$ furnished with a steel liner $d^2$ to receive the gravity head $e$, the upper end of the said hole being provided with a circular upstanding rim or flange $e^1$, as above described, to serve as a stop for the disk $e^2$ upon the upper part of the gravity head. The disk $e^2$ is provided with a hollow shank or stem $f$ which is internally screw-threaded and upon which there is slidably mounted a sleeve $f^1$, the upper end of which is connected to the upper end of the gravity head $e$, which is screw-threaded and engages the corresponding internal screw-thread in the bore of the shank $f$. The sleeve $f^1$ has rigidly secured to its lower end a measuring wheel $g$ which is provided with graduations to any suitable dimensions, a fixed pointer $g^1$ secured to the boss $d$ being provided against which the indications on the wheel can be read off. Furthermore, the hollow stem or shank of the disks $e^2$ is also graduated with units of length, say, for example, fortieths of an inch, the gage wheel $g$ being then correspondingly graduated to indicate ten-thousandth parts of an inch. This device constitutes a micrometer gage. Convenient means for indicating the slight differences of movement of the gravity head $e$ comprise, as above described, the spring blade $h$ which is secured at one end to the boss $d$ on the bracket $c$ and passes through a recess $h^1$, (Fig. 4) in the rim or flange $e^1$ on the latter, its free or outer end carrying the mirror $h^2$ on to which a beam of light is projected from an electric lamp or other source of light $i$ mounted on the arm $j$, carried by the bracket $c$, the said beam of light being passed through a condenser $k$, mounted upon a support $k^1$, also carried upon the arm $j$. Both the lamp $i$ and the support $k^1$ are adjustable on the arm $j$ in the direction of its length. The arm $j$ is so placed that the beam of light is projected at an inclination on to the mirror $h^2$, whence it is reflected on to the stationary mirror $l$ carried in a casing $l^1$ through an aperture $l^2$ (Fig. 4) in which the spring blade $h$ projects, so that the mirror $h^2$ is situated immediately behind the said stationary mirror $l$ in the casing $l^1$. From the mirror $l$ the reflected beam is caused to impinge again upon the mirror $h^2$ whence it is again reflected on to the scale $m$, mounted in a casing $m^1$ carried by a swivel holder $m^2$ which is clamped on an upright pillar $n$ mounted upon an arm $o$ to which it is secured in the desired position by the clamp $n^1$. The arm $j$ is pivoted to the bracket $c$ at $j^1$ and and the arm $o$ is pivoted thereto at $o^1$ so that the two arms can be adjusted to the correct inclination to one another for the beam of light received by the mirror $h^2$ to be reflected along the arm $o$ to the scale $m$. $j^2$, $o^2$ are screws for clamping the arms $j$ $o$ to the bracket $c$ after adjustment.

In practice it is advisable that the disk $e^2$ be prevented from turning relatively to the flange $e^1$ and this may be effected, as shown in the drawing, by a pin $p$ projecting from the upper face of the boss $d$ and engaging a hole in the disk $e^2$. The latter can thus move axially relatively to the flange $e^1$ but cannot turn with respect thereto.

In using the machine for comparing the dimension of a gage with that of a standard gage A, the latter is placed on the anvil $a$, and the bracket $c$ is adjusted upon the upright rods $b$ in the manner hereinbefore described, so that the gravity head $e$ rests freely upon the said standard gage without being supported by the rim or flange $e^1$, whereby the image projected from the mirror $h^2$ indicates a point on the scale independent of a predetermined or zero position which is that which it occupies when the disk $e$ rests or is supported on the rim or flange $e^1$ as shown in the drawing. By now substituting the gage to be compared for the standard gage A the image of light indicates a new point on the scale and the difference of measurement is thus ascertained. When removing the gage it will be seen that the disk $e^2$ on the gravity head $e$ will fall and make contact with the rim or flange $e^1$, whereby the indicator will return to the zero or predetermined position on the scale, thus indicating that the machine is in good adjustment.

To employ the machine for measuring the dimensions of objects, the bracket $c$ is lowered until the lower end of the gravity head $e$ bears upon the anvil $a$ so as to free the disk $e^2$ on the gravity head from the flange $e^1$. The light indicated then rises on the scale $m$ to a certain division which is noted. The gravity head is then raised through the medium of the graduated wheel $g$ to a sufficient height to permit of the placing of the article to be measured beneath the lower end of the same. The wheel $g$ is then turned in the opposite direction so as to lower the gravity head on to the said article and this movement is continued until the indicator on the scale reassumes the position which it occupied when the machine was set as above described. The reading on the micrometer gage will then give the desired dimension.

Instead of employing a disk $e^2$ which is separate from the gravity head as above described, I may make the said disk integral therewith as shown in Fig. 5, and such an arrangement can be advantageously employed when the machine is used for comparing an article with a standard article as above described.

Although the micrometer graduations are only designed for measuring of dimensions within certain prescribed limits it will be obvious that the machine can be used for ascertaining larger dimensions by supporting the article to be measured, instead of directly upon the anvil, upon standard blocks which themselves are placed upon the anvil.

Claims.

1. The combination with a movable head adapted to engage the specimen to be tested, of a blade spring fixed adjacent said head, a mirror carried by said spring and adapted to be moved when the movable head changes its position, a source of light adapted to direct its beam on said mirror, and a scale receiving the light reflected by said mirror.

2. A measuring machine comprising a bracket, a fixed anvil adapted to support a specimen to be tested, a gravity head, a blade spring fixed at one end to the bracket and carrying a mirror at its other end, the said spring being located in the path of the gravity head disk, means for projecting a beam of light on to the mirror, and a scale on which the light is reflected from said mirror.

3. A measuring machine as defined in claim 2, in which the disk is movable and adjustable upon the gravity head, and a micrometer measuring device for adjusting the position of the disk on said head.

4. A measuring machine comprising a support including an anvil adapted to support the specimen to be measured, a bracket carried by said support, said bracket including converging arms merging into a bearing, a gravity head movably mounted in said bearing and adapted to engage the specimen supported by the anvil, a supporting member actuated by said head, a mirror carried by the supporting member, means for projecting a beam of light on said mirror, and a scale receiving the beam of light reflected from said mirror.

5. A machine of the kind defined in claim 4, in which the bracket is adjustably mounted on the support.

6. A machine as defined in claim 4 in which the light projecting means is carried by one of said arms and the scale is carried by the other arm.

7. A machine as defined in claim 6, in which the free ends of the arms are adjustable toward and away from each other.

GEORGE BROWN.